(12) United States Patent
Bousset et al.

(10) Patent No.: US 9,522,654 B2
(45) Date of Patent: Dec. 20, 2016

(54) LIQUID-SPRAYING DEVICE FOR WIPER

(75) Inventors: Xavier Bousset, Mezel (FR); Grégory Kolanowski, Siaugues-Saint-Romain (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 232 days.

(21) Appl. No.: 14/009,880

(22) PCT Filed: Apr. 2, 2012

(86) PCT No.: PCT/EP2012/055952
§ 371 (c)(1),
(2), (4) Date: Oct. 30, 2013

(87) PCT Pub. No.: WO2012/136621
PCT Pub. Date: Oct. 11, 2012

(65) Prior Publication Data
US 2014/0047661 A1 Feb. 20, 2014

(30) Foreign Application Priority Data
Apr. 6, 2011 (FR) ...................... 11 53003

(51) Int. Cl.
*B60S 1/52* (2006.01)
*B60S 1/38* (2006.01)

(52) U.S. Cl.
CPC ................ *B60S 1/524* (2013.01); *B60S 1/381* (2013.01); *B60S 1/3881* (2013.01); *B60S 1/3889* (2013.01)

(58) Field of Classification Search
CPC ............................... B60S 1/524; B60S 1/3862
USPC ..................................... 15/250.04
See application file for complete search history.

(56) References Cited

U.S. PATENT DOCUMENTS

| | | | | |
|---|---|---|---|---|
| 7,316,362 B2* | 1/2008 | Miyauchi | ................. | B05B 1/08 239/102.1 |
| 2008/0216274 A1* | 9/2008 | Egner-Walter | .......... | B60S 1/524 15/250.02 |
| 2009/0172907 A1* | 7/2009 | Egner-Walter | ........ | B60S 1/3862 15/250.01 |

FOREIGN PATENT DOCUMENTS

| | | | | |
|---|---|---|---|---|
| DE | 10000373 A1 * | 8/2001 | ................ | B60S 1/38 |
| DE | 10 2006 013 900 A1 | 9/2007 | | |
| DE | 10 2009 017990 A1 | 10/2010 | | |
| EP | 860336 A1 * | 8/1998 | ................ | B60S 1/38 |
| EP | 1 918 167 A1 | 5/2008 | | |
| FR | 2 920 729 A1 | 3/2009 | | |
| GB | 851883 A * | 10/1969 | ................ | B60S 1/52 |
| WO | 2008/006982 A1 | 1/2008 | | |
| WO | 2008/148614 A1 | 12/2008 | | |
| WO | 2009/118286 A1 | 10/2009 | | |

OTHER PUBLICATIONS

EP860336A1 (machine translation), 1998.*

(Continued)

*Primary Examiner* — Monica Carter
*Assistant Examiner* — Andrew A Horton
(74) *Attorney, Agent, or Firm* — Osha Liang LLP

(57) ABSTRACT

The invention relates to a device (12) for spraying a liquid, intended to be fitted to a longitudinal end of a wiper blade consisting of at least one backing (5) and a wiping edge (1), the device comprising a body (23) and a channel (13) for streaming the liquid, which body and channel are unitary, said channel (13) comprising an inlet orifice (15) and a spraying orifice (16), in which the body (23) comprises a housing (27) intended to receive the backing (5).

16 Claims, 2 Drawing Sheets

(56) References Cited

OTHER PUBLICATIONS

Figure 1:
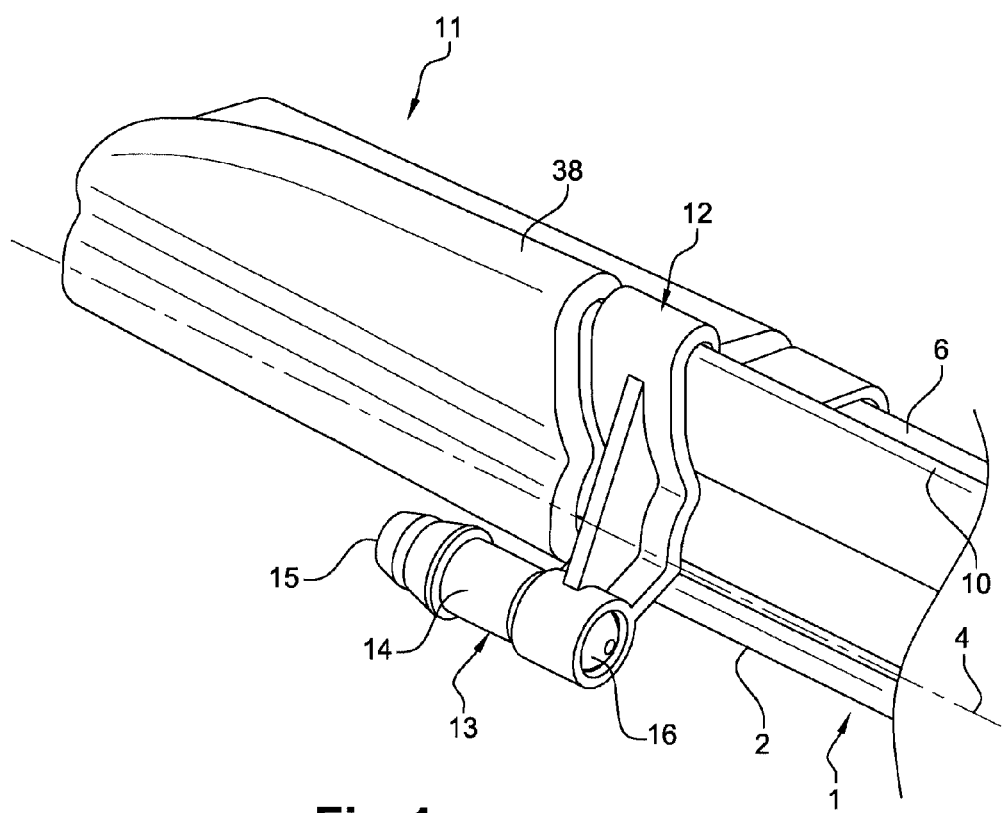

DE10000373A1 (machine translation), 2001.*
FR2920729 (machine translation), 2009.*
International Search Report issued in PCT/EP2012/055952 mailed on Jun. 15, 2012 (6 pages).

* cited by examiner

LIQUID-SPRAYING DEVICE FOR WIPER

The field of the present invention is that of equipment for vehicles, and more particularly that of equipment for wiping the windows of motor vehicles.

Motor vehicles are commonly equipped with windshield wiper systems for washing the windshield and avoiding disruption to the driver's view of his surroundings. These windshield wipers are conventionally driven by an arm that carries out an angular to-and-fro movement and have elongate wipers which themselves carry squeegee blades made of a resilient material. These blades rub against the windshield and evacuate the water by removing it from the driver's field of view. The wipers are produced in the form either, in a conventional version, of articulated yokes which hold the squeegee blade at a number of discrete locations or, in a more recent version, known as the "flat blade" version, of a semi-rigid assembly which holds the squeegee blade along its entire length. In this second solution, the wiper is attached to the turning arm of the windshield wiper by an assembly consisting of a mechanical connector and an adaptor. The mechanical connector is a piece which is crimped directly onto the flat blade, while the adaptor is an intermediate piece which allows the connector to be fastened to the arm of the windshield wiper. These two pieces are connected to one another by a transverse pin that allows their relative rotation in a plane perpendicular to the windshield passing through the arm.

Windshield wipers are also equipped with devices for feeding a windshield washer liquid which is fed from a tank installed on the vehicle and which is sprayed in the direction of the windshield by nozzles located either around the windshield or on the windshield wiper itself, as is the case with the device disclosed in the document WO2008/148614A1.

The spraying device disclosed in said document is carried by an end fitting which is itself fastened to a wiper frame. However, the way in which the spraying device is arranged is not detailed, and no industrial-scale solution meeting the economic requirements of the automotive sector is shown in said document.

The aim of the present invention is thus to solve the drawback described above, mainly by proposing a technical solution for spraying a liquid onto a window of a motor vehicle, this being realizable from an industrial point of view. In other words, the solution covered by the invention is both reliable and viable from an economic point of view, making it suitable for use in the automotive sector. Similarly, the design of the spraying device according to the invention makes its mounting on a wiper compatible with the requirements of motor vehicle manufacturers. Finally, such a spraying device can be retrofitted easily since it requires only a small adjustment of the length of a component of the wiper.

The subject of the invention is thus a device for spraying a liquid, intended to be mounted at a longitudinal end of a wiper consisting of at least one vertebra and a wiper blade, comprising a body and a circulation channel for the liquid that are produced in one piece, said channel comprising an intake orifice and a spraying orifice, and wherein the body comprises a housing intended to receive the vertebra.

Advantageously, the housing passes from one side to the other of the constituent body of the spraying device. In other words, the housing comprises two openings which extend respectively into a first face and into a second face bordering the body.

According to one embodiment, the spraying device comprises a recess intended to receive a constituent heel of the wiper blade. This recess forms a mechanical retention means for the wiper with respect to the spraying device.

This spraying device furthermore comprises an internal volume delimited by the body and by a peripheral wall, said internal volume being able to receive a constituent support of the wiper. It will be understood here that this internal volume is open toward the outside and has an access opening through which the support passes into the internal volume. Such a solution improves the mechanical retention of the support on the vertebra. It also improves the appearance of the wiper carrying such a spraying device, since the peripheral wall covers the cutout made at the end of the support, thereby making it possible to conceal any burrs.

Alternatively, it is possible for the spraying device not to have an internal volume. In such a situation, the body comprises a face which serves as an end stop, that is to say against which the support of the wiper can come into abutment.

In a complementary manner, a protuberance is also provided. The latter originates on the body, said protuberance being intended to pass into the interior of an end fitting mounted at the end, in other words at the longitudinal end of the wiper. Such a protuberance increases the mechanical strength of the spraying device with respect to the wiper.

It will be noted in particular that the body is interposed between the internal volume and the protrusion since, during an assembly phase, the protuberance faces the end piece while the internal volume is open toward the support.

In one exemplary embodiment, the spraying orifice is in the form of a hole made in a wall molded together with the circulation channel. It will be understood here that the channel is plugged by the same material at its end having the spraying orifice, being molded together with the latter so as to produce the channel.

Alternatively, the spraying orifice is realized by a pierced ball connected to an open end of the channel. Such a ball is held in the channel but has a degree of rotational freedom with respect to this channel.

More specifically, the spraying device extends in a first direction known as a "longitudinal" direction in that it extends parallel to the longitudinal direction of the wiper. Similarly, the channel extends in a second longitudinal direction, the latter being parallel to the first longitudinal direction. Sprinkling of a region of the window that is as close as possible to the wiper blade is thus ensured.

Advantageously, the channel is connected to the body by at least one arm which originates on an outer face of a peripheral wall which, together with the body, delimits an internal volume.

The invention also covers the combination of an end fitting mounted at the longitudinal end of a wiper with a spraying device as detailed hereinabove, such a combination being known as an "assembly" hereinbelow.

In this assembly, the end fitting may comprise an outer wall delimiting an inner space which receives a protuberance protruding from the spraying device, that is to say integral with the spraying device. The mechanical retention of the spraying device on the wiper is thus improved.

Advantageously, said outer wall comes into abutment against a peripheral wall, adjacent to the protuberance, of the spraying device.

The invention furthermore covers a wiper comprising at least one support, a vertebra, a wiper blade and a spraying device as per any one of the features set out hereinabove, said spraying device being installed at a longitudinal end of the wiper.

Advantageously, the support is offset longitudinally with respect to the vertebra in order to form a zone for receiving the spraying device.

Such an offset may be produced by adjusting the dimensions of the support. Thus, the latter has a dimension along a longitudinal axis of the wiper which is less than a dimension of the vertebra measured along this same axis, so as to form said zone, said zone receiving the end fitting. This shortening of the support may be produced for example by cutting a support of a conventional wiper. Such a disposition thus has the advantage of standardizing the manufacture of supports for a wiper without a spraying device according to the invention or with such a device.

A first advantage according to the invention lies in the manner of integrating the spraying device on the outside of the wiper. Specifically, this wiping device is threaded onto the vertebra and interposed between the support of the wiper and an end fitting connected to the end of this wiper. This is a technical solution which is simple to implement, is reliable and meets the economic constraints that exist in the automotive sector.

Another advantage lies in the compactness of the wiper comprising the spraying device. Specifically, it is possible to feed the windshield washer liquid as close as possible to the wiper blade, thereby making it possible to optimize its use.

Figure 2:
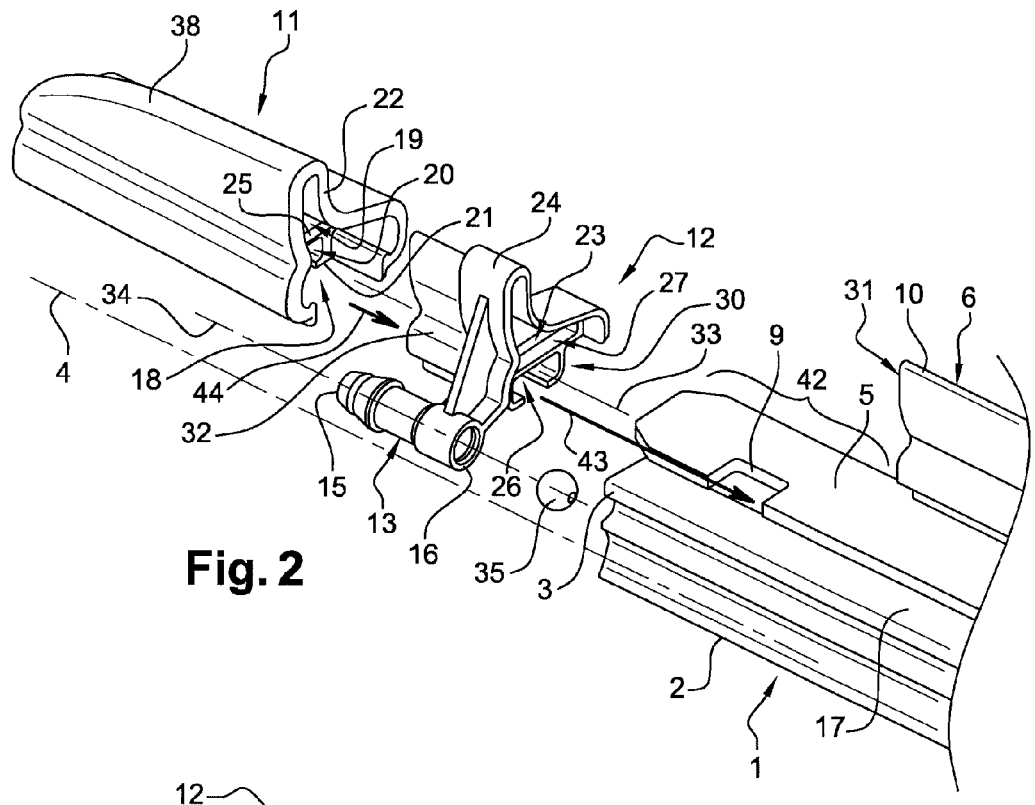
Figure 3:
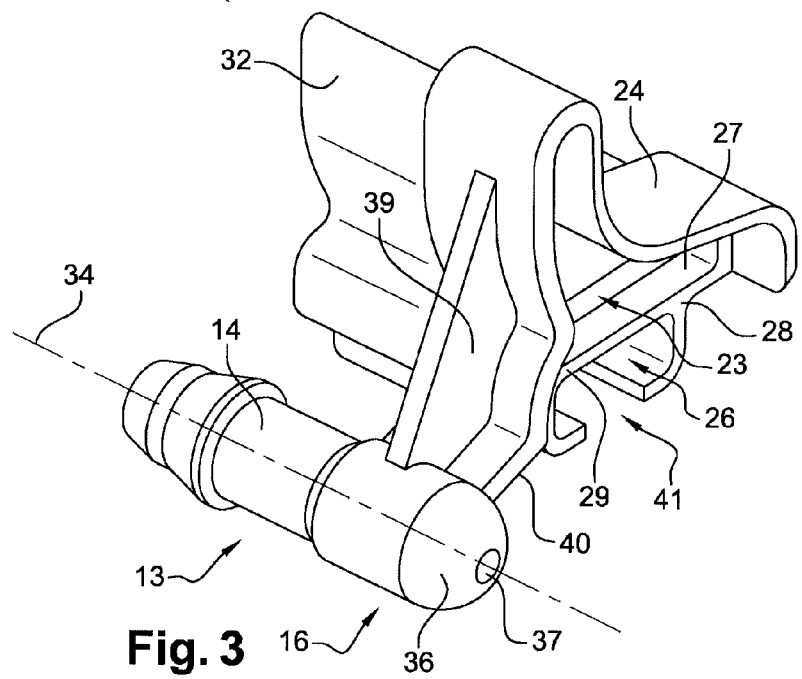

Further features, details and advantages of the invention will become more clearly apparent from reading the description given hereinbelow by way of illustration and with reference to the drawings, in which:

FIG. 1 is a perspective view of one end of a wiper equipped with an exemplary embodiment of a spraying device according to the invention, FIG. 2 is an exploded view of FIG. 1, FIG. 3 is a perspective view of the spraying device according to the invention.

It should be noted that the figures disclose the invention in a detailed manner so as to implement the invention, and said figures may of course serve to define the invention more clearly, where necessary.

FIG. 1 shows in a partial manner a wiper with which a wiping system mounted on a motor vehicle is provided. This wiper is installed on the front windshield of the vehicle but it may also be mounted on the rear window of the latter.

The wiper comprises a wiper blade 1, also known as a squeegee blade, consisting of a zone 2 for rubbing on the window, said zone being connected to a heel by a thinned portion. This heel provides the mechanical connection to a constituent support of the wiper. This wiper blade 1 extends lengthwise along a longitudinal axis 4.

The wiper furthermore comprises a vertebra which forms a stiffening device of the wiper. By way of example, this is a single metal strip which extends along the longitudinal axis 4, thus defining its length, and which has at rest a convex curvature with respect to the windshield. This strip has a predetermined flexibility, which, by deforming when the wiper is pressed against the windshield, brings about a force distributed along the entire length of the wiper blade 1.

The blade 1 and the vertebra are held by the support 6 which thus forms a longitudinal supporting frame covering and retaining the vertebra and the wiper blade 1. This support 6 thus provides a mechanical connection between the blade 1 and the vertebra. It furthermore comprises an air deflector 10, the function of which is to increase the pressing force of the wiper blade on the windshield to the benefit of the aerodynamic effect of the air. In this exemplary embodiment, the air deflector 10 and the support 6 form a common assembly. They are for example molded from one and the same flexible material such as rubber or an elastomer.

At the end of the wiper there is installed an end fitting 11. In a general manner, this end fitting 11 carries out a multiplicity of functions:
it is involved in the mechanical retention of the spraying device on the wiper,
it allows the wiper blade 1 to be mounted on and removed from the support 6, it being possible for the latter to be replaced by translation of the blade with respect to the support 6,
it provides an esthetic finish for the end of the wiper.

The end fitting 11 has a section generally complementary to the section of the support 6 and of the deflector 10. This end fitting comprises an outer wall 38 which follows the profile of the support 6 and of the deflector 10.

FIG. 1 also shows an exemplary embodiment of the device 12 for spraying a windshield washer liquid. Such a device supplies a quantity of liquid onto the glazed surface so as to promote the cleaning of the latter by the scraping action of the wiper.

This spraying device 12 is mounted at one end of the wiper along the longitudinal axis 4.

Such a spraying device 12 comprises at least one body and a circulation channel 13 for the liquid that are produced in one piece. It will be understood here that this channel 13 and this body are molded simultaneously from one plastics material. They thus form an assembly which is inseparable without destroying one or the other of these elements.

The channel 13 is in the form of a hollow and cylindrical tube 14 which comprises, at a first longitudinal end, a liquid intake orifice 15 and, at a second end opposite the first end with respect to the tube 14, a spraying orifice 16.

This spraying device 12 is captive between the support 6 and the end fitting 11. It is held by means of a housing formed in its body, through which the vertebra of the wiper passes.

FIG. 2 shows in more detail the structure of the constituent elements of the wiper according to the invention.

The wiper blade 1 comprises its rubbing zone 2 and its heel 3 delimited by an upper wall 17. The vertebra is in this case provided with the reference 5 and it can be seen that the latter comprises a cutout 9 provided on one side of the vertebra. Such a cutout is involved in securing the end fitting 11 to the wiper.

The end fitting 11 is delimited with respect to the outside by the outer wall 38. In other words, the outer wall delimits at least partially a volume or space in which a first cavity 19 and a second cavity 20 extend.

The first cavity 19 is able to receive the vertebra 5 while the second cavity 20 is able to receive the wiper blade 1, more specifically the heel 3 of the blade.

The first cavity 19 is formed in the constituent plastics material of the end fitting 11. This first cavity 19 corresponds to a removal of material having a section complementary to the section of the vertebra 5. Such a first cavity 19 extends in a direction parallel to the longitudinal axis 4. This first cavity 19 is thus delimited on one side by a constituent upper face of the end fitting 11 and on the other side by an intermediate wall 25. Laterally, this first cavity 19 is bordered by two flanks attached to an inner face of the outer wall 38.

The second cavity 20 receives the heel 3 of the wiper blade 1. This second cavity 20 extends longitudinally in the end fitting 11 in a direction parallel to the longitudinal axis 4. Such a second cavity 20 is opposite the first cavity 19 with respect to the intermediate wall 25. It will be understood that the latter delimits both the first cavity 19 and the second cavity 20. The end fitting 11 also comprises a cutout aligned with the second cavity 20, said cutout opening the latter toward the surroundings of the end fitting 11. Such a cutout, which has a width less than the width of the second cavity 20 measured along a transverse axis perpendicular to the longitudinal axis 4, allows the thinned portion located between the heel 3 and the rubbing zone 2 to pass through.

It will be noted that the end fitting 11 comprises a face 21 into which the first cavity 19 and the second cavity 20 open. This face 21 extends in a plane perpendicular to the longitudinal axis 4 and this face 21 is formed in a manner set back from an edge 22 which terminates the outer wall 38. In other words, the outer wall 38 is extended beyond the face 21 so as to form an inner space 18 in which a part of the spraying device 12 is housed.

FIGS. 2 and 3 show in detail the structure of the spraying device 12. The latter comprises the body 23 and the fluid circulation channel 13. This body 23 serves to support a peripheral wall 24, the latter having in particular a profile complementary to the profile of the support 6 and the deflector 10.

The body 23 comprises a housing 27 having a section complementary to the section of the vertebra 5. By way of example, this section is rectangular.

The housing 27 thus forms a hole which passes from one side to the other of the body 23 in order to allow the vertebra 5 to pass through in order to be joined to the end fitting 11, in particular the first cavity 19 of this end fitting 11. Such a housing ensures the mechanical retention of the spraying device 12 with respect to the vertebra 5, and consequently with respect to the wiper.

The body 23 of the spraying device 12 furthermore comprises a recess 26 intended to receive the heel 3 of the wiper blade 1. The cross section perpendicular to the longitudinal axis 4 of the recess 26 is thus complementary to the section of the heel 3 in an identical cross section. This recess 26 passes from one side to the other of the body 23 of the spraying device 12 so as to allow the heel 3 to be inserted into the end fitting 11.

A constituent separating wall 29 of the body 23 is formed between the housing 27 and the recess 26. The wall 29 extends along the longitudinal axis 4.

The body 23 is delimited by an inner face 28 at which the housing 27 and the recess 26 open out. The peripheral wall 24 is extended in the direction of the longitudinal axis 4 beyond the inner face 28 and thus delimits, together with this inner face 28, an internal volume 30. This internal volume 30 thus receives the support 6 and advantageously the air deflector 10 of the wiper. In other words, the peripheral wall 24 overlaps the support 6, thereby making it possible to hide any unsightly burrs that result from cutting the support 6. The inner face 28 and an extreme edge surface 31 of the support 6 form two end stops which come into abutment against one another when the spraying device 12 is threaded onto the vertebra 5.

Opposite this internal volume 30 with respect to the body 23, the spraying device 12 comprises a protuberance 32 which originates on the body 23 and extends in a direction parallel to the longitudinal axis 4. It will be understood here that the protuberance 32 is molded simultaneously with the body 23 of the spraying device 12.

This protuberance 32, also known as an extension, has a cross section orthogonal to the longitudinal axis 4 that is complementary to the section of the volume of the inner space 18 of the end fitting 11 in one and the same cross section. Such a protuberance 32 passes into the interior of the end fitting 11, in particular into the interior of the inner space 18 of the end fitting 11.

It will thus be understood that the body 23 is interposed between the internal volume 30 and the protuberance 32, the wall 24 covering the body 23 and the internal volume 30.

The spraying device 12 extends in a first longitudinal direction 33 which is parallel to the longitudinal axis 4, while the fluid circulation channel 13 extends in a second longitudinal direction 34. In one exemplary embodiment of the invention, the second longitudinal direction 34 is parallel to the first longitudinal direction 33. Such a disposition favors the efficacy of cleaning the wiped window, since it allows the windshield washer liquid to be sprayed as close as possible to the wiper blade. Such parallelism ensures that the liquid is not sprayed either onto the wiper blade 1 or at a distance too far from the wiper blade 1.

FIG. 2 also shows a distinctive aspect of the invention. Specifically, the support 6 is offset with respect to the vertebra 5 along the longitudinal axis 4. Such an offset thus frees a zone 42 which is intended to receive at least the spraying device 12. Advantageously, this zone 42 also receives the end fitting 11, the spraying device 12 then being interposed between the support 6 and the end fitting 11. The presence of such a zone 42 makes the combination of the support 6 with the vertebra 5 and the wiper blade 1 distinctive for use with the spraying device 12. In other words, this combination is distinctive when the support 6 is shorter, along the longitudinal axis 4, compared with the length of the vertebra 5, and possibly the length of the wiper blade 1.

According to one exemplary embodiment of the wiper blade, the support 6 has a dimension along the longitudinal axis 4, that is to say a length, of the wiper that is less than a dimension of the vertebra 5 measured along this same axis. Such a disposition thus makes it easily possible to form the zone 42, for example by cutting the support 6 to a length less than the vertebra 5.

FIG. 2 shows an exemplary embodiment of the spraying orifice 16. The tube 14 is thus open so as to receive a ball 35 that is pierced by hole in its center. The latter is then fitted into the tube 14 so as to be able to move in rotation and to be fixed in translation in order that the spraying of liquid can be adjusted to the desires of the vehicle user.

FIG. 3 illustrates another exemplary embodiment of the spraying orifice 16. The tube 14 is closed at its second end by a wall 36, for example a spherical wall, molded simultaneously with the formation of the liquid circulation channel 13. This spherical wall has a hole 37 which extends along a central axis coincident with the second longitudinal direction 34, this hole 37 spraying the liquid onto the window to be wiped.

The liquid circulation channel 13, the body 23, the peripheral wall 24 and possibly the protuberance 32 form a single piece, that is to say one produced simultaneously from one and the same material, for example a plastics material.

The liquid circulation channel 13 is thus mechanically connected to the body 23 via at least one arm 39, also known as a strut. This arm 39 originates on one side on an outer face of the peripheral wall 24 and on the other side on the tube 14. In a complementary manner, such a connection is completed by an extension 40 of the peripheral wall 24 in the direction of the tube 14. In such a situation, the arm 29 extends in a plane perpendicular to the extension 40 of the peripheral wall 24.

The recess 26 is open toward the outside of the spraying device 12 by means of a groove 41, the latter extending along an axis parallel to the direction of extension of the recess 26. Thus, on either side of the groove 41, the recess forms two hooks which enclose the heel 3 of the wiper blade. The liquid spraying device 12 is thus involved in the mechanical retention of the wiper blade, at least along a part of its length. It is also possible to extract and/or to insert the wiper blade 1 by translation along the longitudinal axis 4 with respect to the support 6. The end fitting 11 may thus have removable fastening means on the wiper so as to enable the extraction or insertion of the wiper blade, and at the same time to secure the position of the wiper blade after it has been replaced. In the event that the wiper blade is worn, it is thus possible to replace only the latter and to keep the other components such as the support 6, the deflector 10, the vertebra 5, the spraying device 12 or the end fitting 11, since the service life of these components is greater than that of the wiper blade 1.

By way of the arrow with the reference 43, FIG. 2 illustrates a method for assembling the spraying device 12 on a wiper having a reception zone 42, where, the spraying device 12 is fitted onto the wiper by sliding a constituent vertebra 5 of the wiper into a housing 27 formed in the spraying device 12.

The arrow 44 illustrates an additional step, during which the end fitting 11 is threaded onto the end of the vertebra 5, and in a general manner onto the end of the wiper, by engagement between the vertebra 5 and a first cavity 19 formed in the end fitting 11.

Finally, the method may be completed by a prior step of reducing a length of a support 6 with respect to a length of a vertebra 5, the support 6 and the vertebra 5 being constituent parts of the wiper.

Such a reduction is for example carried out by a step of cutting the support 6.

Such a spraying device may also be employed in the context of a wiper comprising two vertebrae positioned in each case in a longitudinal groove on either side of a wiper blade incorporating a deflector. The housing 27 thus makes it possible to position the spraying device by sliding on the vertebrae of the wiper, and the recess 26 thus has a form matching the profile of the wiper blade. These elements, and also the protuberance 32, ensure that the spraying device is held on the wiper.

The invention claimed is:

1. A device for spraying a liquid directly on the windshield of the vehicle, mounted at a terminal longitudinal end of a wiper comprising at least one vertebra and a wiper blade, said device comprising a body and a circulation channel for the liquid that are produced in one piece, said body comprising:
    a housing adapted to receive the at least one vertebra and forming a hole which passes from one side to another side of the body;
    a recess which passes from the one side the other side of the body and receives a heel of the wiper blade;
    a constituent separating wall of the body formed between the housing and the recess, said circulation channel comprising an inlet orifice and a spraying orifice; and
    an internal volume delimited by the body and by a peripheral wall, said internal volume being able to receive a support of the wiper,
    wherein the spraying orifice sprays the liquid directly on the windshield of the vehicle,
    wherein the at least one vertebra passes through from the one side to the other side of the body through the hole and the heel passes through from the one side to the other side of the body through the recess,
    wherein the support forms a longitudinal supporting frame that covers and retains the vertebra and the wiper blade, and
    wherein the device for spraying a liquid is received by an end fitting mounted at the terminal longitudinal end of the wiper.

2. The device as claimed in claim 1, wherein the support provides a mechanical link between the blade and the vertebra of the wiper and comprises an air deflector.

3. The device as claimed in claim 2, wherein the air deflector increases the pressing force of the wiper blade on the windshield to a benefit of an aerodynamic effect of air, and wherein the support and the air deflector form a common assembly.

4. The device as claimed in claim 1, wherein a protuberance which originates on the body is provided, said protuberance being intended to pass into the interior of the end fitting mounted at the terminal longitudinal end of the wiper, said body being interposed between the internal volume and the protuberance.

5. The device as claimed in claim 1, wherein the spraying orifice is in the form of a hole made in a wall molded together with the liquid circulation channel.

6. The device as claimed in claim 1, wherein the spraying orifice is realized by a pierced ball connected to an open end of the liquid circulation channel.

7. The device as claimed in claim 1, which extends in a first longitudinal direction, the liquid circulation channel extending in a second longitudinal direction, wherein the second longitudinal direction is parallel to the first longitudinal direction.

8. The device as claimed in claim 1, wherein the liquid circulation channel is connected to the body by at least one arm which originates on an outer face of a peripheral wall which, together with the body, delimits an internal volume.

9. An assembly comprising:
    an end fitting that is installed at a terminal longitudinal end of a wiper; and
    the device for spraying a liquid for the wiper as claimed in claim 1.

10. The assembly as claimed in claim 9, wherein the end fitting comprises an outer wall delimiting an inner space which receives a protuberance protruding from the spraying device.

11. A wiper comprising:
    at least one support;
    a vertebra;
    a wiper blade; and
    the spraying device as claimed in claim 1 installed at a terminal longitudinal end of the wiper.

12. The wiper as claimed in claim 11, wherein the support is offset longitudinally with respect to the vertebra in order to form a zone for receiving the spraying device.

13. The wiper as claimed in claim 12, wherein the support has a dimension along a longitudinal axis of the wiper which is less than a dimension of the vertebra measured along this same axis, so as to form said zone.

14. The wiper as claimed in claim 12, wherein the zone receives an end fitting.

15. The device claimed in claim 1, wherein the housing has a section complementary to a section of the vertebra.

16. The device claimed in claim 1, wherein the recess has a complementary cross section to a section of the heel.

* * * * *